United States Patent
Nishimura

(10) Patent No.: US 11,701,686 B2
(45) Date of Patent: Jul. 18, 2023

(54) METHOD FOR FORMING MULTILAYER COATING FILM

(71) Applicant: NIPPON PAINT AUTOMOTIVE COATINGS CO., LTD., Osaka (JP)

(72) Inventor: Akihiro Nishimura, Hirakata (JP)

(73) Assignee: NIPPON PAINT AUTOMOTIVE COATINGS CO., LTD., Osaka (JP)

( * ) Notice: Subject to any disclaimer, the term of this patent is extended or adjusted under 35 U.S.C. 154(b) by 531 days.

(21) Appl. No.: 17/044,472

(22) PCT Filed: Nov. 29, 2019

(86) PCT No.: PCT/JP2019/046813
§ 371 (c)(1),
(2) Date: Oct. 1, 2020

(87) PCT Pub. No.: WO2020/137360
PCT Pub. Date: Jul. 2, 2020

(65) Prior Publication Data
US 2021/0039136 A1 Feb. 11, 2021

(30) Foreign Application Priority Data
Dec. 25, 2018 (JP) .................. 2018-241498

(51) Int. Cl.
*B05D 7/00* (2006.01)
*C09D 133/10* (2006.01)
*C09D 179/02* (2006.01)
*C08K 3/22* (2006.01)

(52) U.S. Cl.
CPC ........... *B05D 7/572* (2013.01); *C09D 133/10* (2013.01); *C09D 179/02* (2013.01); *B05D 7/574* (2013.01); *C08K 2003/2237* (2013.01)

(58) Field of Classification Search
CPC .... B05D 7/572; B05D 7/574; B05D 2451/00; B05D 2401/20; C09D 133/10; C09D 179/02
See application file for complete search history.

(56) References Cited

U.S. PATENT DOCUMENTS

| | | |
|---|---|---|
| 6,156,379 A | 12/2000 | Terada et al. |
| 2002/0090461 A1 | 7/2002 | Ohmoto et al. |
| 2005/0249954 A1* | 11/2005 | Kawaguchi ............ B05D 7/577 |
| | | 427/458 |
| 2007/0237903 A1 | 10/2007 | Hiwara et al. |
| 2009/0041943 A1 | 2/2009 | Ogawa et al. |
| 2018/0104718 A1 | 4/2018 | Nakayabu et al. |
| 2019/0039090 A1 | 2/2019 | Takeda et al. |
| 2020/0061668 A1 | 2/2020 | Omura et al. |

FOREIGN PATENT DOCUMENTS

| | | |
|---|---|---|
| EP | 1 354 911 | 10/2003 |
| EP | 3 797 878 | 3/2021 |
| JP | 11-80620 | 3/1999 |
| JP | 2006-224024 | 8/2006 |
| JP | 2011-147916 | 8/2011 |
| JP | 2012-45478 | 3/2012 |
| WO | 2004/105965 | 12/2004 |
| WO | 2006/009219 | 1/2006 |
| WO | 2009/014226 | 1/2009 |
| WO | 2009/073423 | 6/2009 |
| WO | 2015/156032 | 10/2015 |
| WO | 2017/135090 | 8/2017 |
| WO | 2017/162475 | 9/2017 |
| WO | 2018/181193 | 10/2018 |

OTHER PUBLICATIONS

English translation of International Preliminary Report on Patentability dated Jul. 8, 2021 in International (PCT) Application No. PCT/JP2019/046813.
Extended European Search Report dated Dec. 16, 2021 in corresponding European Patent Application No. 19901773.2.
International Search Report (ISR) dated Mar. 3, 2020 in International (PCT) Application No. PCT/JP2019/046813.

\* cited by examiner

*Primary Examiner* — Francisco W Tschen
(74) *Attorney, Agent, or Firm* — Wenderoth, Lind & Ponack, L.L.P.

(57) ABSTRACT

Provided is a method for forming a multilayer coating film.

16 Claims, No Drawings

METHOD FOR FORMING MULTILAYER COATING FILM

TECHNICAL FIELD

The present invention relates to a method for forming a multilayer coating film comprising a coating film containing a scaly luster pigment.

BACKGROUND ART

On the surface of an article to be coated such as an automobile body is formed sequentially a plurality of coating films having various roles, and thus the article is protected and concurrently is provided with a beautiful appearance and an excellent design. A common method for forming such a plurality of coating films is a method in which an undercoating film such as an electrodeposition coating film is formed on an article to be coated superior in conductivity, and then an intermediate coating film and a top coating film are formed one on another on the undercoating film. Among these coating films, the top coating film consisting of a base coating film and a clear coating film particularly has a great influence on the appearance and design of a coating film. Especially in automobiles, the appearance and design of a top coating film consisting of a base coating film and a clear coating film formed on a vehicle body are extremely important.

Base coating films can be roughly divided into coating films called solid color, which are free from scaly pigments, and coating films containing scaly pigments, which have a sparkle texture. In recent years, consumers tend to prefer coating films containing a scaly pigment, which have a sparkle texture. The scaly pigment contained in the base coating film having a sparkle texture reflects light or produces interference light, which gives a sparkle texture to the coating film.

In order to obtain a good sparkle texture using a coating composition containing a scaly pigment, it is necessary to control the orientation of the scaly pigment contained in the cured coating film such that the orientation is along the surface shape of the article to be coated. This is because the orientated state of the scaly pigment greatly affects the reflection of light or the appearance of interference light in the coating film.

For example, JP-A-11-80620 (Patent Literature 1) discloses a coating composition containing a scaly pigment which is a metal piece. When such a coating composition contains a large amount of water and an organic solvent, the scaly pigment is oriented along the surface shape of the article to be coated in the coating film formed. In the uncured coating film formed by applying the aqueous coating composition, the orientation of the scaly pigment is generally in a random state. Then, by heating, the thickness of the coating film becomes thinner as the solvent contained in the uncured coating film gradually evaporates. Then, as the thickness of the coating film becomes thinner, the inclination of the scaly pigment becomes gentler, and as a result, the scaly pigment is oriented along the surface shape of the article to be coated. Thus, in the coating composition of Patent Literature 1, a large amount of the solvent contained in the coating composition is volatilized to cause the uncured coating film to shrink in volume, thereby controlling the orientation of the scaly pigment.

JP-A-2012-45478 (Patent Literature 2) discloses a luster multilayer coating film comprising an upper layer coating film in which a luster color pigment is oriented and a lower layer coating film, wherein the coating material solid content of the upper layer coating material is within the range of 5 to 15% by mass. Paragraph[0062] of Patent Literature 2 describes that "in the method for forming a luster multilayer coating film 1 of the present invention, the use of a thermally curable first aqueous base coating material having a low coating material solid concentration results in a multilayer coating film with a higher color saturation. When the coating material solid concentration in the thermally curable first aqueous base coating material is low, the content of an aqueous medium is high, so that the uncured coating film 12 significantly shrinks in the film thickness direction as the aqueous medium is volatilized in the preheating step or the baking step described below . . . . If the uncured coating film (the first base coating film 12) shrinks in the film thickness direction, a force of orienting the coating material components such as the luster color pigment 15 contained in the uncured coating film (the first base coating film 12) acts in the film thickness direction, namely, in the coating film surface direction of the lower layer."

CITATION LIST

Patent Literature

Patent Literature 1: JP-A-11-80620
Patent Literature 2: JP-A-2012-45478

SUMMARY OF INVENTION

Technical Problems

As described in Patent Literatures 1 and 2, it has been investigated to increase the orientation of a luster color pigment by reducing the resin solid concentration or the coating material solid concentration contained in a coating composition. On the other hand, when merely reducing the resin solid concentration or the coating material solid concentration in the coating composition, it is necessary to evaporate a large amount of the solvent contained in the uncured coating film, and therefore the amount of the energy needed at the time of bake curing tends to be large. Therefore, there is a technical problem that it becomes difficult to meet the demands for energy saving and $CO_2$ emission reduction.

The present invention is to solve the above-mentioned existing problems, and an object of the present invention is to provide a new means for increasing the orientation of a scaly luster pigment in the formation of a multilayer coating film including a coating film comprising the luster pigment.

Solutions to Problems

In order to solve the above-described problems, the present invention provides the following embodiments.

[1]

A method for forming a multilayer coating film, comprising:

an intermediate coating step of applying an aqueous intermediate coating composition (A) to a surface of an article to be coated to form an uncured aqueous intermediate coating film, a first aqueous base coating step of applying a first aqueous base coating composition (B) onto the uncured aqueous intermediate coating film to form an uncured first aqueous base coating film, a second aqueous base coating step of applying a second aqueous base coating composition (C) containing a scaly luster pigment onto the uncured first aqueous base coating film to form an uncured second aqueous base coating film, a clear coating step of applying a clear coating composition (D) onto the uncured second aqueous base coating film to form an uncured clear coating film, and a curing step of heat curing at once the uncured aqueous intermediate coating film, the uncured first aqueous base coating film, the uncured second aqueous base coating film, and the uncured clear coating film each obtained in the preceding steps to form a multilayer coating film, wherein a solid concentration $NV_{mB}$ (% by mass) attained at 1 minute after coating, of the uncured first aqueous base coating film formed in the first aqueous base coating step and a solid concentration $NV_{sB}$ (% by mass) attained at 1 minute after coating, of an uncured first aqueous base coating film formed by applying the first aqueous base coating composition (B) alone satisfy formula:

$1.2 \leq NV_{mB}/NV_{sB}$, and the solid concentration $NV_{mB}$ (% by mass) and a solid concentration $NV_{sC}$ (% by mass) attained at 1 minute after coating, of an uncured second aqueous base coating film formed by applying the second aqueous base coating composition (C) alone satisfy formula:

$NV_{mB}$ (% by mass)$-NV_{sC}$ (% by mass)$\geq 20$(% by mass).

[2]

The method for forming a multilayer coating film, wherein the uncured first aqueous base coating film formed in the first aqueous base coating step has a viscosity $\eta_{mB}$ attained at 1 minute after coating of 270 Pa·s or more.

[3]

The method for forming a multilayer coating film, wherein the solid concentration $NV_{sB}$ (% by mass) attained at 1 minute after coating, of the uncured first aqueous base coating film formed by applying the first aqueous base coating composition (B) alone is 20% by mass or more and 40% by mass or less, and a viscosity $\eta_{sB}$ attained at 1 minute after coating, of the uncured first aqueous base coating film formed by applying the first aqueous base coating composition (B) alone is in a range of 30 to 300 Pa·s.

[4]

The method for forming a multilayer coating film, wherein the solid concentration $NV_{sC}$ (% by mass) attained at 1 minute after coating, of an uncured second aqueous base coating film formed by applying the second aqueous base coating composition (C) alone is 10% by mass or more and 25% by mass or less.

[5]

The method for forming a multilayer coating film, wherein a solid concentration $NV_{mA}$ (% by mass) of the uncured aqueous intermediate coating film in the first aqueous base coating step is 80% by mass or more.

[6]

The method for forming a multilayer coating film, wherein the amount of the scaly luster pigment contained in the second aqueous base coating composition (C) is in a range of 20 to 40 parts by mass per 100 parts by mass of the resin solid content of the second aqueous base coating composition (C).

Advantageous Effects of Invention

According to the above method for forming a multilayer coating film, the orientation of a scaly luster pigment can be enhanced in a second aqueous base coating film containing the scaly luster pigment. The multilayer coating film formed by the above method for forming a multilayer coating film is characterized in that the unevenness in the orientation of a luster pigment is reduced and the coating film has good appearance.

DESCRIPTION OF EMBODIMENTS

The above method for forming a multilayer coating film is a method comprising the following steps:

an intermediate coating step of applying an aqueous intermediate coating composition (A) to a surface of an article to be coated to form an uncured aqueous intermediate coating film, a first aqueous base coating step of applying a first aqueous base coating composition (B) onto the uncured aqueous intermediate coating film to form an uncured first aqueous base coating film, a second aqueous base coating step of applying a second aqueous base coating composition (C) containing a scaly luster pigment onto the uncured first aqueous base coating film to form an uncured second aqueous base coating film, a clear coating step of applying a clear coating composition (D) onto the uncured second aqueous base coating film to form an uncured clear coating film, and a curing step of heat curing at once the uncured aqueous intermediate coating film, the uncured first aqueous base coating film, the uncured second aqueous base coating film, and the uncured clear coating film each obtained in the preceding steps to form a multilayer coating film. Hereinafter, each coating composition will be described.

Aqueous Intermediate Coating Composition (A)

The aqueous intermediate coating composition (A) contains a water-dispersible resin, a curing agent, and optionally a pigment, an additive, and the like.

Water-Dispersible Resin

The water-dispersible resin of the aqueous intermediate coating composition (A) preferably contains at least one species selected from among acrylic resins and polyester resins.

The acrylic resin may be, for example, an acrylic resin emulsion that can be obtained by emulsion polymerizing a monomer mixture containing an alkyl (meth)acrylate (a), an acid group-containing ethylenically unsaturated monomer (b), and a hydroxyl group-containing ethylenically unsaturated monomer (c). The acrylic resin may also be an acrylic resin dispersion obtained by solution polymerizing the above monomer mixture and then dispersing the resulting polymer in an aqueous medium.

The monomer mixture containing the alkyl (meth)acrylate (a) has an advantage that the main skeleton of the acrylic resin emulsion is well formed. Examples of the alkyl (meth) acrylate (a) include methyl (meth)acrylate, ethyl (meth) acrylate, propyl (meth)acrylate, n-butyl (meth)acrylate, isobutyl (meth)acrylate, t-butyl (meth)acrylate, hexyl (meth) acrylate, 2-ethylhexyl (meth)acrylate, octyl (meth)acrylate, nonyl (meth)acrylate, decyl (meth)acrylate, dodecyl (meth) acrylate, and stearyl (meth)acrylate. In the present description, (meth)acryl means acryl and methacryl.

The acid group of the acid group-containing ethylenically unsaturated monomer (b) is preferably selected from among a carboxyl group, a sulfonic acid group, a phosphoric acid group, etc. A particularly preferable acid group is a carboxyl group from the viewpoints of improvement in dispersion stability and the function of accelerating a curing reaction. The monomer mixture containing the acid group-containing ethylenically unsaturated monomer (b) has an advantage that various stability such as storage stability, mechanical stability, and stability against freezing of the resulting acrylic resin emulsion can be improved and a curing reaction with a curing agent such as a melamine resin at the time of coating film formation can be promoted.

Specific examples of the carboxyl group-containing ethylenically unsaturated monomer, which is one of the acid group-containing ethylenically unsaturated monomer (b), include acrylic acid, methacrylic acid, crotonic acid, isocrotonic acid, ethacrylic acid, propylacrylic acid, isopropylacrylic acid, itaconic acid, maleic anhydride, and fumaric acid. Specific examples of the sulfonic acid group-containing ethylenically unsaturated monomer, which is one of the acid group-containing ethylenically unsaturated monomer (b), include p-vinylbenzenesulfonic acid, p-acrylamidopropanesulfonic acid, and t-butylacrylamidosulfonic acid. Specific examples of the phosphoric acid group-containing ethylenically unsaturated monomer, which is one of the acid group-containing ethylenically unsaturated monomer (b), include LIGHT ESTER PM (manufactured by Kyoeisha Chemical Co., Ltd.), etc., such as a phosphoric acid monoester of 2-hydroxyethyl acrylate and a phosphoric acid monoester of 2-hydroxypropyl methacrylate.

Examples of the hydroxyl group-containing ethylenically unsaturated monomer (c) include 2-hydroxyethyl (meth)acrylate, 2-hydroxypropyl (meth)acrylate, 4-hydroxybutyl (meth)acrylate, and ε-caprolactone-modified acrylic monomers.

Examples of the above-mentioned ε-caprolactone-modified acrylic monomers include "PLACCEL FA-1", "PLACCEL FA-2", "PLACCEL FA-3", "PLACCEL FA-4", "PLACCEL FA-5", "PLACCEL FM-1", "PLACCEL FM-2", "PLACCEL FM-3", "PLACCEL FM-4", and "PLACCEL FM-5" manufactured by Daicel Chemical Industries, Ltd.

The monomer mixture containing the hydroxyl group-containing ethylenically unsaturated monomer (c) has an advantage that hydrophilicity based on hydroxyl groups is imparted to the acrylic resin emulsion, and the workability and stability against freezing of the coating composition can be improved, and curing reactivity with a curing agent such as a melamine resin is imparted.

The monomer mixture may contain other components in addition to the above monomers. Examples of the other components include at least one monomer selected from the group consisting of styrene-based monomers, (meth)acrylonitrile, and (meth)acrylamide. Examples of the styrene-based monomers include styrene and α-methylstyrene.

The monomer mixture may also contain a crosslinkable monomer such as a carbonyl group-containing ethylenically unsaturated monomer, a hydrolytically polymerizable silyl group-containing monomer, and various polyfunctional vinyl monomers. For example, the monomer mixture containing a crosslinkable monomer has an advantage that self-crosslinkability can be imparted to the resulting acrylic resin emulsion.

In the preparation of the acrylic resin emulsion, emulsion polymerization can be carried out by heating the monomer mixture in an aqueous medium in the presence of a radical polymerization initiator and an emulsifier under stirring conditions. The reaction temperature may be, for example, about 30 to 100° C. The reaction time may be appropriately chosen according to the reaction scale and the reaction temperature, and may be, for example, about 1 to 10 hours. In the emulsion polymerization, for example, the monomer mixture or a monomer pre-emulsion liquid may be added all at once to a reaction vessel charged with water and the emulsifier, or may be dropped for a while. By appropriately selecting such a procedure, the reaction temperature can be adjusted.

As the radical polymerization initiator, known initiators used in emulsion polymerization of acrylic resin can be used. Regarding the radical polymerization initiator, specifically, persulfates, such as potassium persulfate, sodium persulfate, and ammonium persulfate, can be used in the form of an aqueous solution as a water-soluble free radical polymerization initiator. In addition, a so-called redox initiator containing a combination of an oxidizing agent such as potassium persulfate, sodium persulfate, ammonium persulfate and hydrogen peroxide and a reducing agent such as sodium bisulfite, sodium thiosulfate, Rongalite and ascorbic acid can be used in the state of an aqueous solution.

As the emulsifier, for example, an anion or nonionic emulsifier selected from among micelle compounds each having a hydrocarbon group having 6 or more carbon atoms and a hydrophilic moiety such as a carboxylate, a sulfonate or a sulfate partial ester, in one molecule can be used. Among these, examples of the anionic emulsifier include an alkali metal salt or an ammonium salt of a half ester of sulfuric acid with an alkyl phenol or a fatty alcohol; an alkali metal salt or an ammonium salt of an alkyl sulfonate or an allyl sulfonate; an alkali metal salt or an ammonium salt of a half ester of sulfuric acid with a polyoxyethylene alkylphenyl ether, a polyoxyethylene alkyl ether or a polyoxyethylene allyl ether. Examples of the nonionic emulsifier include a polyoxyethylene alkylphenyl ether, a polyoxyethylene alkyl ether, or a polyoxyethylene allyl ether. Besides such general-purpose anionic and nonionic emulsifiers, various anionic or nonionic, reactive emulsifiers each having, in its molecule, a radically polymerizable unsaturated double bond-containing group, such as an acrylic group, a methacrylic group, a propenyl group, an allyl group, an allyl ether group, a maleic group can be used.

In the emulsion polymerization, an auxiliary agent for controlling the molecular weight (chain transfer agent), such as mercaptan compounds and lower alcohols, may be used, if necessary. Using such auxiliary agents affords an advantage that emulsion polymerization can be favorably progressed, and also has an advantage that the smooth and uniform formation of a coating film can be promoted and the adhesion to a substrate can be improved.

As the emulsion polymerization, there may be appropriately selected any polymerization method, such as a single-stage continuous uniform dropwise monomer addition method, a core-shell polymerization method that is a multi-stage monomer feeding method, and a power feed polymerization method wherein the constitution of monomers to be fed is continuously altered during polymerization.

A basic compound may be added to the resulting acrylic resin emulsion to neutralize a part or all of a carboxylic acid. Performing the neutralization affords an advantage that the stability of the acrylic resin emulsion can be improved. As the basic compound, for example, ammonia, amines, and alkali metals can be used.

The acrylic resin emulsion can be prepared as described above. The weight-average molecular weight of the resulting acrylic resin emulsion is not particularly limited, but is preferably, for example, in the range of 50,000 to 5,000,000, and more preferably in the range of 50,000 to 200,000. The solid acid value of the acrylic resin emulsion is preferably in the range of 1 to 80 mg KOH/g, more preferably in the range of 2 to 70 mg KOH/g, and even more preferably in the range of 3 to 60 mg KOH/g. The solid hydroxyl value of the acrylic resin is preferably in the range of 50 to 120 mg KOH/g, and more preferably in the range of 50 to 100 mg KOH/g. The weight-average molecular weight, the solid acid value, the solid hydroxyl value, etc. of the acrylic resin emulsion being within the above ranges afford an advantage that the coating material stability, the coating workability and the physical properties of a resulting coating film can be secured in good conditions.

The acrylic resin dispersion can be prepared, for example, by subjecting a monomer mixture containing the alkyl (meth)acrylate (a), the acid group-containing ethylenically unsaturated monomer (b), and the hydroxyl group-containing ethylenically unsaturated monomer (c) to a polymerization reaction in the absence of solvents or the presence of an appropriate organic solvent, adding the mixture dropwise to water, followed by mixing, and, if necessary, removing an excess solvent.

A polymerization initiator may be used in the polymerization reaction. As the polymerization initiator, for example, an initiator that is used in this technical field as a radical polymerization initiator can be used. Specific examples of the polymerization initiator include organic peroxides such as benzoyl peroxide, t-butyl peroxide and cumene hydroperoxide, and organic azo compounds such as azobiscyanovaleric acid and azoisobutyronitrile.

The polymerization reaction can be carried out at a temperature of 80 to 140° C., for example. The polymerization reaction time may be appropriately chosen according to the polymerization temperature and the reaction scale, and the polymerization reaction can be carried out for 1 to 8 hours, for example. The polymerization reaction can be performed by an operation commonly performed by those skilled in the art. For example, polymerization can be performed by adding a monomer mixture containing an ethylenically unsaturated monomer and a polymerization initiator dropwise to a heated organic solvent. The organic solvent that can be used for the polymerization is not particularly limited, and one having a boiling point of about 60 to 250° C. is preferable. Examples of organic solvents that can be suitably used include water-insoluble organic solvents such as butyl acetate, xylene, toluene, methyl isobutyl ketone, propylene glycol, dipropylene glycol dimethyl ether, methyl ether acetate; and water-soluble organic solvents such as tetrahydrofuran, ethanol, methanol, propanol, isopropanol, 2-butanol, t-butyl alcohol, dioxane, methyl ethyl ketone, ethylene glycol, ethylene glycol monobutyl ether, 2-methoxypropanol, 2-butoxypropanol, diethylene glycol monobutyl ether, butyl diglycol, N-methylpyrrolidone, ethylene carbonate, and propylene carbonate.

At least a part of the acid groups contained in the acrylic resin obtained by the polymerization may be neutralized by adding a neutralizer to the acrylic resin. This step can satisfactorily impart water dispersibility to the acrylic resin. The neutralizer is not particularly limited as long as it is commonly used to neutralize acid groups contained in a water-dispersible resin composition when the composition is prepared. Examples thereof include organic amines such as monomethylamine, dimethylamine, trimethylamine, triethylamine, diisopropylamine, monoethanolamine, diethanolamine, and dimethylethanolamine, and inorganic bases such as sodium hydroxide, potassium hydroxide, and lithium hydroxide. These neutralizers may be used singly or two or more of them may be used in combination.

The acrylic resin dispersion can be prepared by mixing water with the optionally neutralized acrylic resin, or mixing the acrylic resin with water. In the preparation of the acrylic resin dispersion, excess organic solvent may be removed, if necessary, before the addition of the neutralizer or after the dispersion in water.

The acrylic resin dispersion can be prepared as described above. The resulting acrylic resin dispersion is not particularly limited, but the solid hydroxyl value is preferably in the range of 5 to 200 mg KOH/g, the solid acid value is preferably in the range of 5 to 100 mg KOH/g, and the weight-average molecular weight is preferably in the range of 50,000 to 5,000,000. The solid hydroxyl value, the solid acid value, and the weight-average molecular weight of the acrylic resin dispersion being in the above ranges affords an advantage that the coating material stability, the coating workability, and the resulting coating film properties can be ensured in a good state.

The water-dispersible resin of the aqueous intermediate coating composition (A) may include a polyester resin. Generally, the polyester resin that can be used as the water-dispersible resin can be prepared by condensing a polyhydric alcohol component and a polybasic acid component such that the requirement regarding a hydroxyl group and a carboxyl group will be satisfied.

Examples of the polyhydric alcohol component may include ethylene glycol, diethylene glycol, propylene glycol, 1,3-propanediol, 1,4-butanediol, 1,5-pentanediol, 1,6-hexanediol, 2,2-diethyl-1,3-propanediol, neopentyl glycol, 1,9-nonanediol, 1,4-cyclohexanediol, hydroxycarboxylic acid components such as neopentyl glycol hydroxypivalate ester, 2-butyl-2-ethyl-1,3-propanediol, 3-methyl-1,5-pentanediol, and 2,2,4-trimethylpentanediol.

Examples of the polybasic acid component may include polybasic acid components and anhydrides thereof such as aromatic polycarboxylic acids and anhydrides including phthalic anhydride, isophthalic acid, terephthalic acid, trimellitic anhydride, tetrachlorophthalic anhydride, and pyromellitic anhydride; alicyclic polycarboxylic acids and anhydrides thereof including hexahydrophthalic anhydride, tetrahydrophthalic anhydride, and 1,4- and 1,3-cyclohexanedicarboxylic acids; aliphatic polycarboxylic acids and anhydrides thereof including maleic anhydride, fumaric acid, succinic anhydride, adipic acid, and sebacic acid. A monobasic acid such as benzoic acid or t-butylbenzoic acid may be used together, if necessary.

Moreover, monohydric alcohols, monoepoxide compounds such as CARDURA E (trade name, produced by Shell Chemical), and lactones (β-propiolactone, dimethylpropiolactone, butyrolactone, γ-valerolactone, ε-caprolactone, γ-caprolactone, etc.) may be used together as reaction components.

In addition to the above-mentioned components, fatty acids such as castor oil and dehydrated castor oil, and an oil component that is a mixture of one or two or more of such fatty acids may be added to the acid component and the alcohol component. Moreover, it is also possible to graft an acrylic resin or vinyl resin or to react a polyisocyanate compound as long as the requirement regarding a hydroxyl group and a carboxyl group is satisfied.

The thus-obtained polyester resin has a number-average molecular weight of preferably 500 to 20,000, and more preferably 1,500 to 10,000. When the number-average molecular weight is less than 500, the storage stability may deteriorate in the case where the polyester resin is dispersed in water. When the number-average molecular weight exceeds 20,000, the viscosity of the polyester resin increases, and therefore, the solid concentration decreases when the polyester resin is formed into a coating composition and coating workability may deteriorate.

The polyester resin has a glass transition point of preferably −20 to 80° C. When the glass transition point is less than −20° C., the hardness of a resulting coating film may decrease, and when exceeding 80° C., the base hiding property may deteriorate. The glass transition point is more preferably 0 to 60° C. The glass transition point of a polyester resin can be determined by calculation from the type and amount of the monomers used for the preparation of the polyester resin. The glass transition point of the polyester resin may be measured with a differential scanning calorimeter (DSC).

The polyester resin thus obtained is preferably neutralized with the basic compounds mentioned above or the like.

The aqueous intermediate coating composition (A) may optionally contain other resin components. Such other resin components are not particularly limited, and include such resin components as water-soluble acrylic resin, alkyd resin, epoxy resin, and urethane resin.

The content of the water-dispersible resin contained in the aqueous intermediate coating composition (A) is preferably 30 to 80% by mass, and more preferably 50 to 80% by mass based on the resin solid content of the aqueous intermediate coating composition (A). In the present description, the resin solid content means the total solid content of the coating film-forming resin components such as the water-dispersible resin, the curing agent and other resin components.

For example, when a mixture of an acrylic resin and a polyester resin is used as the water-dispersible resin contained in the aqueous intermediate coating composition (A), a ratio of the acrylic resin to the polyester resin is preferably in the range of acrylic resin/polyester resin=7/1 to 0.5/1, and more preferably in the range of 6/1 to 1/1.

Curing Agent

The curing agent of the aqueous intermediate coating composition (A) is a component that cures the water-dispersible resin. As the curing agent, for example, a polyisocyanate compound, a melamine resin, and the like can be used. As the curing agent, a blocked isocyanate compound obtained by blocking an isocyanate group of a polyisocyanate compound with a blocking agent can also be used.

Examples of the polyisocyanate compound include water-dispersible compounds and hydrophobic compounds. Examples of the hydrophobic polyisocyanate compound include polyisocyanate compounds such as aromatic diisocyanates including tolylene diisocyanate (TDI), 4,4'-diphenylmethane diisocyanate (MDI), xylylene diisocyanate (XDI), and metaxylylene diisocyanate (MXDI); aliphatic diisocyanates including hexamethylene diisocyanate (HDI); alicyclic diisocyanates including isophorone diisocyanate (IPDI) and hydrogenated MDI; compounds resulting from such diisocyanate compounds by reducing their volatility and thereby converting them into less toxic forms; adducts of such diisocyanate compounds, including biurets, uretdiones, and isocyanurates; and relatively low-molecular-weight urethane prepolymers.

Examples of the water-dispersible polyisocyanate compound include products prepared by introducing a hydrophilic group into the polyisocyanate compounds mentioned above, and products prepared by mixing and emulsifying with a surfactant and thereby self-emulsifying the polyisocyanate compounds.

Examples of the hydrophilic group include anionic groups such as a carboxyl group and a sulfonic acid group, cationic groups such as a tertiary amino group, and nonionic groups such as a polyoxyalkylene group. Among these, in consideration of the water resistance of a resulting coating film, the hydrophilic group is preferably a nonionic group. As a specific nonionic group, a polyoxyethylene group having high hydrophilicity is preferable.

Examples of the surfactant suitably used for the preparation of a self-emulsifiable polyisocyanate compound obtained by mixing and emulsifying the above-mentioned polyisocyanate compound and the surfactant include an anionic surfactant having an anionic group such as a carboxyl group or a sulfonic acid group, a cationic surfactant having a cationic group such as a tertiary amino group, and a nonionic surfactant having a nonionic group such as a polyoxyalkylene group. Among them, in consideration of the water resistance of a resulting coating film, it is more preferable to use a nonionic surfactant.

A commercially available product may be used as the polyisocyanate compound that is water-dispersible. Examples of the commercially available products include Aquanate 100, Aquanate 110, Aquanate 200 and Aquanate 210 (produced by Tosoh Corporation), Bayhydur TPLS-2032, SUB-Isocyanate L801, Bayhydur VPLS-2319, Bayhydur 3100, VPLS-2336 and VPLS-2150/1, Bayhydur 305, Bayhydur XP-2655 (produced by Sumika Bayer Urethane Co., Ltd.), Takenate WD-720, Takenate WD-725 and Takenate WD-220 (produced by Mitsui Takeda Chemicals, Inc.), and RESAMINE D-56 (produced by Dainichiseika Color & Chemicals Mfg. Co., Ltd.).

As the polyisocyanate compound, it is more preferable to use one having dispersibility in water. The polyisocyanate compound may be used singly, or two or more species thereof may be used in combination.

The blocked isocyanate compound can be prepared by blocking a part or all of the isocyanate groups of the polyisocyanate compound with a blocking agent. As the blocking agent, for example, a compound having an active methylene group, a ketone compound, a caprolactam compound, or the like can be used. When such a blocked isocyanate compound is heated, a blocking agent is dissociated, so that an isocyanate group is generated, whereby the blocked isocyanate compound functions as a curing agent.

Examples of the compound having an active methylene group include active methylene compounds such as acetylacetone, ethyl acetoacetate, and ethyl malonate. Examples of the ketone compound include methyl ethyl ketone and methyl isobutyl ketone. Examples of the caprolactam compound include ε-caprolactam. Among these, a blocked isocyanate compound obtained by subjecting the above-mentioned polyisocyanate compound to an addition reaction with an active methylene compound or a ketone compound is more preferably used.

Commercially available products may be used as the blocked isocyanate compound. Examples of the commercially available products include DURANATE (blocked hexamethylene diisocyanate) series manufactured by Asahi Kasei Corporation, more specifically, active methylene type blocked isocyanates, such as DURANATE MF-K60X and the like, and Sumidur BL3175, Desmodur BL3272MPA, Desmodur BL3475 BA/SN, Desmodur BL3575/1 MPA/SN, Desmodur BL4265 SN, Desmodur BL5375 MPA/SN, Desmodur VP LS2078/2 and the like, each manufactured by Bayer AG.

The curing agent may contain a melamine resin, if necessary. The melamine resin is a condensate obtained by modifying a condensate of an amino compound such as melamine and an aldehyde compound such as formaldehyde and acetaldehyde with a lower alcohol such as methanol, ethanol, propanol and butanol. Specific examples of such melamine resin include complete alkyl type methyl/butyl mixed etherified melamine resin, methylol group type methyl/butyl mixed etherified melamine resin, imino type methyl/butyl mixed etherified melamine resin, complete alkyl type methylated melamine resin, and imino group-type methylated melamine resin.

As the melamine resin, a commercially available product may be used. Examples of the commercially available product include complete alkyl type methyl/butyl mixed etherified melamine resins such as CYMEL 232, CYMEL 232S, CYMEL 235, CYMEL 236, CYMEL 238, CYMEL 266, CYMEL 267, and CYMEL 285; methylol group type methyl/butyl mixed etherified melamine resins such as CYMEL 272; imino type methyl/butyl mixed etherified melamine resin such as CYMEL 202, CYMEL 207, CYMEL 212, CYMEL 253, and CYMEL 254; complete alkyl type methylated melamine resins such as CYMEL 300, CYMEL 301, CYMEL 303, and CYMEL 350; imino group type methylated melamine resin such as CYMEL 325, CYMEL 327, CYMEL 703, CYMEL 712, CYMEL 254, CYMEL 253, CYMEL 212, and CYMEL 1128 (the above are manufactured by Allnex Japan Inc.), and U-VAN 20SE60 (butyl etherified melamine resin, manufactured by Mitsui Chemicals, Inc.).

As the curing agent, a component (for example, a carbodiimide compound) other than the above polyisocyanate compound and melamine resin may be used, if necessary.

The content of the curing agent contained in the aqueous intermediate coating composition (A) in the present invention is preferably 5 to 55% by mass, and more preferably 10 to 45% by mass based on the resin solid content of the aqueous intermediate coating composition (A).

Other Components and Methods of Preparation

If necessary, the aqueous intermediate coating composition may contain, in addition to the above-mentioned water-dispersible resin and curing agent, a pigment, a curing catalyst, a surface conditioning agent, a deforming agent, a pigment dispersant, a plasticizer, a film-forming assistant, an ultraviolet absorber, an antioxidant, solvents (aqueous solvent, organic solvents), etc.

Examples of the pigment include coloring pigments, extender pigments, and luster pigments. Examples of the coloring pigments include organic coloring pigments such as azo chelate pigments, insoluble azo pigments, condensed azo pigments, diketopyrrolopyrrole pigments, benzimidazolone pigments, phthalocyanine pigments, indigo pigments, perinone pigments, perylene pigments, dioxane pigments, quinacridone pigments, isoindolinone pigments, and metal complex pigments; and inorganic coloring pigments such as yellow iron oxide, nickel titanium yellow, red iron oxide, carbon black, and titanium dioxide. Examples of the extender pigments include calcium carbonate, barium sulfate, clay, and talc. Examples of the luster pigments include colored or non-colored metallic luster pigments including metals or alloys such as aluminum, copper, zinc, iron, nickel, tin, and aluminum oxide, interference mica pigments, white mica pigments, and graphite pigments.

When the aqueous intermediate coating composition (A) contains a pigment, it is preferable to prepare the coating composition in the state of a pigment dispersion paste in which the pigment is preliminarily dispersed using a dispersant such as a pigment dispersion paste.

When the aqueous intermediate coating composition (A) contains a pigment, the content of the pigment in terms of the total pigment concentration (PWC) in the coating composition is preferably in the range defined by a lower limit of 0.1 parts by mass and an upper limit of 50 parts by mass per 100 parts by mass of the resin solid content of the aqueous intermediate coating composition (A).

Generally, the resin solid concentration of the aqueous intermediate coating composition is preferably set to 15 to 60% by mass though it varies depending on the application condition.

The method for preparing the aqueous intermediate coating composition (A) is not particularly limited, and the coating composition can be prepared by a method commonly used by those skilled in the art, such as kneading and dispersing the water-dispersible resin, the curing agent, and various components and pigments as necessary by using a disperser, a homogenizer, a kneader, or the like.

First Aqueous Base Coating Composition (B)

The first aqueous base coating composition (B) contains a water-dispersible resin, a curing agent, and optionally a pigment and an additive.

As the water-dispersible resin of the first aqueous base coating composition (B), the acrylic resins, the polyester resins, etc. that can be used for the above-described aqueous intermediate coating composition (A) can be used. The water-dispersible resin of the first aqueous base coating composition (B) preferably contains the above-described acrylic resin emulsion. The acrylic resin emulsion can be prepared by emulsion polymerization of the above-described monomer mixture.

The weight-average molecular weight of the acrylic resin emulsion preferably contained in the water-dispersible resin of the first aqueous base coating composition (B) is not particularly limited, and is preferably in the range of 50,000 to 5,000,000, and more preferably in the range of 50,000 to 200,000. The solid acid value of the acrylic resin emulsion is preferably in the range of 1 to 80 mg KOH/g, more preferably in the range of 2 to 70 mg KOH/g, and even more preferably in the range of 3 to 60 mg KOH/g. The solid hydroxyl value of the acrylic resin is preferably in the range of 50 to 120 mg KOH/g, and more preferably in the range of 50 to 100 mg KOH/g. The weight-average molecular weight, the solid acid value, the solid hydroxyl value, etc. of the acrylic resin emulsion being within the above ranges afford an advantage that the coating material stability, the coating workability and the physical properties of a resulting coating film can be secured in good conditions.

As the curing agent and the optional pigment and additive of the first aqueous base coating composition (B), the curing agents, the pigments, and the additives that can be used for the aqueous intermediate coating composition (A) can be preferably used. The first aqueous base coating composition (B) can be prepared in the same manner as the preparation of the aqueous intermediate coating composition (A).

The coating material solid concentration of the first aqueous base coating composition (B) is preferably in the range of 5 to 45% by mass, and more preferably in the range of 10 to 40% by mass.

The first aqueous base coating composition (B) preferably contains a pigment. Examples of the pigment include the above-mentioned coloring pigments, extender pigments, and luster pigments. When the first aqueous base coating composition (B) contains a pigment, the content thereof in terms of the total pigment concentration (PWC) in the coating composition is preferably in the range defined by a lower limit of 0.1 parts by mass and an upper limit of 50 parts by mass par 100 parts by mass of the resin solid content of the first aqueous base coating material (B).

The first aqueous base coating composition (B) preferably has a coating material viscosity at 23° C. adjusted to 300 mPa·s or more and 2000 mPa·s or less. Adjusting the coating material viscosity within the above range offers an advantage that the coating workability is good and the coating film property can be secured well.

The coating material viscosity of the coating composition at 23° C. can be measured in accordance with JIS K5601 using a B-type viscometer (manufactured by TOKIMEC INC., for example).

Second Aqueous Base Coating Composition (C)

The second aqueous base coating composition (C) contains a scaly luster pigment, a water-dispersible resin, a curing agent, and optionally a pigment and an additive. As the water-dispersible resin, the curing agent, and the additive, the same ones as those used in the first aqueous base coating composition can be used.

The second aqueous base coating composition (C) contains a scaly luster pigment. As the scaly luster pigment, for example, those having an average particle size (D50) of 2 to 50 μm and a thickness of 0.1 to 5 μm are preferable. Those having an average particle size in the range of 5 to 35 μm are superior in sparkle texture and are more suitably used. Specific examples of the scaly luster pigment include metallic scaly luster pigments such as metals or alloys including aluminum, copper, zinc, iron, nickel, tin, and aluminum oxide, and mixtures thereof. In addition, interference mica pigments, white mica pigments, and graphite pigments are included therein. Such scaly luster pigments may have been colored as necessary.

The average particle size of the scaly luster pigment means the median diameter of the volume-based particle size distribution measured by a laser diffraction scattering method. The thickness of the scaly luster pigment shall be defined by the average of 100 or more measurements obtained by observing a cross section of a coating film containing the scaly luster pigment with a microscope and measuring the thickness of the scaly luster pigment using image processing software.

Preferably, the amount of the scaly luster pigment contained in the second aqueous base coating composition (C) is in the range of 20 to 40 parts by mass per 100 parts by mass of the resin solid content of the second aqueous base coating composition (C). When the amount of the scaly luster pigment contained in the second aqueous base coating composition (C) is within the above range, the content of the scaly luster pigment tends to be high as compared to common luster color pigment-containing coating compositions. The above-described method for forming a multilayer coating film is characterized in that the orientation of the scaly luster pigment can be controlled in a good condition though the content of the scaly luster pigment is as high as in the range of 20 to 40 parts by mass per 100 parts by mass of the resin solid content.

The second aqueous base coating composition (C) can be prepared by the same procedure as the first aqueous base coating composition (B). As for the scaly luster pigment contained in the second aqueous base coating composition (C), it is preferable to prepare the coating composition in a state where the luster pigment paste containing the scaly luster pigment is prepared in advance. The luster pigment paste can be prepared using a stirring method usually used by those skilled in the art.

The second aqueous base coating composition (C) may contain other pigments in addition to the scaly luster pigment. Examples of such other pigments include coloring pigments and extender pigments. As the coloring pigment and the extender pigment, for example, the pigments mentioned for the above aqueous intermediate coating composition (A) can be suitably used.

When the second aqueous base coating composition (C) contains other pigments, the pigment concentration (PWC) is preferably 5 to 50% by mass.

The second aqueous base coating composition (C) preferably has a coating material viscosity at 23° C. adjusted to 300 mPa·s or more and 2000 mPa·s or less. Adjusting the coating material viscosity within the above range offers an advantage that the coating workability is good and the coating film property can be secured well. The coating material viscosity can be measured in the same manner as the measurement of the coating material viscosity of the first aqueous base coating composition (B).

Clear Coating Composition (D)

The clear coating composition (D) is not particularly limited, and a clear coating composition containing a coating film-forming resin and a curing agent as necessary can be used. Further, a coloring component may be contained as long as it does not impair the design of the base. Examples of the form of the clear coating composition (D) include solvent-type, aqueous-type and powder-type clear coating compositions.

From the viewpoint of transparency or resistance to acid etching, preferable examples of the solvent-type clear coating composition (D) include a combination of an acrylic resin and/or a polyester resin with an amino resin and/or an isocyanate, or an acrylic resin and/or a polyester resin with a carboxylic acid/epoxy curing system.

Examples of the aqueous-type clear coating composition (D) include a water-borne resin prepared by neutralizing, with a base, a coating film-forming resin contained in a composition cited as an example of the above-described solvent-type clear coating composition. The neutralization may be carried out before or after polymerization by adding a tertiary amine such as dimethylethanolamine and triethylamine.

As the powder-type clear coating composition, commonly used powder coating materials such as thermoplastic and thermally curable powder coating materials can be used. Thermally curable powder coating materials are preferable because coating films having good physical properties can be obtained. Specific examples of the thermally curable powder coating material include epoxy-based, acrylic-based and polyester-based powder clear coating compositions, and acrylic-based powder clear coating compositions, which have good weatherability, are particularly preferable.

The clear coating composition (D) may further contain a viscosity controlling agent. As the viscosity controlling agent, for example, those mentioned for the above-described aqueous coating composition can be used. The clear coating composition may further contain a curing catalyst, a surface conditioning agent, etc., as necessary.

Method for Forming Multilayer Coating Film

The above method for forming a multilayer coating film is a method comprising the following steps:

an intermediate coating step of applying an aqueous intermediate coating composition (A) to a surface of an article to be coated to form an uncured aqueous intermediate coating film, a first aqueous base coating step of applying a first aqueous base coating composition (B) onto the uncured aqueous intermediate coating film to form an uncured first aqueous base coating film, a second aqueous base coating step of applying a second aqueous base coating composition (C) containing a scaly luster pigment onto the uncured first aqueous base coating film to form an uncured second aqueous base coating film, a clear coating step of applying a clear coating composition (D) onto the uncured second aqueous base coating film to form an uncured clear coating film, and a curing step of heat curing at once the uncured aqueous intermediate coating film, the uncured first aqueous base coating film, the uncured second aqueous base coating film, and the uncured clear coating film each obtained in the preceding steps to form a multilayer coating film. The above method is characterized in that a solid concentration $NV_{mB}$ (% by mass) attained at 1 minute after coating, of the uncured first aqueous base coating film formed in the first aqueous base coating step and a solid concentration $NV_{sB}$ (% by mass) attained at 1 minute after coating, of an uncured first aqueous base coating film formed by applying the first aqueous base coating composition (B) alone satisfy the following formula:

$$1.2 \leq NV_{mB}/NV_{sB}, \text{ and}$$

the solid concentration $NV_{mB}$ (% by mass) and a solid concentration $NV_{sC}$ (% by mass) attained at 1 minute after coating, of an uncured second aqueous base coating film formed by applying the second aqueous base coating composition (C) alone satisfy the following formula:

$$NV_{mB} \text{ (\% by mass)} - NV_{sC} \text{ (\% by mass)} \geq 20 \text{(\% by mass)}.$$

In the present description, the reasons for measuring the solid concentration and the viscosity of a coating film are measured at a time of 1 minute after coating are that the time of "1 minute after coating" is the shortest time in the operation of measuring the solid concentration and the viscosity of the coating film formed by the coating, and that the case of measuring them at a shortest time after the coating is most effective in order to compare the solid concentration and the viscosity derived from the constitution of the coating composition with the solid concentration and the viscosity derived from the process of the method for forming a coating film because effects such as diffusion of the solvent in the coating film to the atmosphere appear as time passes after the application.

Article to be Coated

The article to be coated that can be used in the above-described coating is not particularly limited, and examples thereof include a metal substrate, a plastic substrate, and a foam thereof.

Examples of the metal substrate include metals such as iron, steel, copper, aluminum, tin, and zinc, and alloys containing such metals. Specific examples of the metal substrate include automobile bodies such as passenger cars, trucks, motorcycles, buses, and parts for automobile bodies. It is more preferable that such a metal substrate has an electrodeposition coating film formed thereon in advance. The metal substrate may have been subjected to a chemical conversion treatment (for example, zinc phosphate chemical conversion treatment and zirconium chemical conversion treatment) as necessary before the electrodeposited coating film is formed.

Examples of the plastic substrate include polypropylene resin, polycarbonate resin, urethane resin, polyester resin, polystyrene resin, ABS resin, vinyl chloride resin, and polyamide resin. Specific examples of the plastic substrate include automobile parts such as spoilers, bumpers, mirror covers, grills, and doorknobs. These plastic substrates are preferably those washed with pure water and/or a neutral detergent. These plastic substrates may have been provided with primer coating in order to enable electrostatic coating.

Intermediate Coating Step

First, the aqueous intermediate coating composition (A) is applied to the surface of an article to be coated to form an uncured aqueous intermediate coating film.

Examples of the application method to be commonly used in the application of the aqueous intermediate coating composition (A) include methods commonly used in the field of coating of automobile bodies, such as multi-stage coating or one-stage coating by air electrostatic spray coating, or a coating method in which air electrostatic spray coating is combined with a rotary atomization type electrostatic applicator, which is called a metallic bell. These application methods have an advantage that a resulting coating film has a good coating film appearance. The thickness of the aqueous intermediate coating film to be formed is preferably, for example, 10 to 100 µm in terms of a dry film thickness, and more preferably 15 to 80 µm.

The "dry film thickness" as referred to herein is used in the meaning generally used in the field of coating materials and has the meaning opposite to "wet film thickness (undried film thickness)". Specifically, it means the film thickness of a cured coating film obtained by applying a coating composition and then heat curing it.

In the above-described method, it is preferable to apply the aqueous intermediate coating composition (A) to an article to be coated and then preheat (preliminarily dry) it by heating or blowing air before applying the first aqueous base coating composition. In the present description, the term "preheating" means heat drying an applied coating composition under conditions such as temperature and time where curing does not occur. Performing the preheating affords an advantage that the solid concentration $NV_{mA}$ of the uncured aqueous intermediate coating film in the first aqueous base coating step described in detail below can be effectively increased, so that the "solid concentration $NV_{mB}$ (% by mass) attained at 1 minute after coating, of the uncured first aqueous base coating film formed in the first aqueous base coating step" described in detail below can be effectively increased.

First Aqueous Base Coating Step

In the first aqueous base coating step, a first aqueous base coating composition (B) is applied to the uncured aqueous intermediate coating film obtained as described above to form an uncured first aqueous base coating film.

Examples of the application method to be commonly used in the application of the first aqueous base coating composition (B) include methods commonly used in the field of coating of automobile bodies, such as multi-stage coating or one-stage coating by air electrostatic spray coating, or a coating method in which air electrostatic spray coating is combined with a rotary atomization type electrostatic applicator, which is called a metallic bell. These application methods have an advantage that a resulting coating film has a good coating film appearance. The thickness of the first aqueous base coating film to be formed is preferably, for example, 1 to 50 µm in terms of a dry film thickness, and more preferably 3 to 30 µm.

In the method for forming a multilayer coating film, it is required that the solid concentration $NV_{mB}$ (% by mass) attained at 1 minute after coating, of the uncured first aqueous base coating film formed in the first aqueous base coating step and the solid concentration $NV_{sB}$ (% by mass) attained at 1 minute after coating, of the uncured first aqueous base coating film formed by applying the first aqueous base coating composition (B) alone satisfy the following formula, $$1.2 \leq NV_{mB}/NV_{sB}.$$

The upper limit of the numerical value of the above-mentioned $NV_{mB}/NV_{sB}$ is not particularly limited, but there is an embodiment where it is 5.0, for example. The upper limit may be either 3.0 or 2.5, for example.

The "solid concentration $NV_{mB}$ (% by mass) attained at 1 minute after coating, of the uncured first aqueous base coating film formed in the first aqueous base coating step" in the above-described method for forming a multilayer coating film is measured by applying a first aqueous base coating composition (B) to the uncured aqueous intermediate coating film in the first aqueous base coating step, taking out the applied first aqueous base coating composition existing on the aqueous intermediate coating film after a lapse of 1 minute after the application of the composition (B), and then measuring a solid concentration. The "solid concentration $NV_{mB}$ (% by mass) attained at 1 minute after coating, of the uncured first aqueous base coating film formed in the first aqueous base coating step" in the above-described method for forming a multilayer coating film can be a solid concentration derived from the process of the method for forming a coating film rather than a solid concentration derived from the constitution of the coating composition.

Next, the "solid concentration $NV_{sB}$ (% by mass) attained at 1 minute after coating, of the uncured first aqueous base coating film formed by applying the first aqueous base coating composition (B) alone" in the above-described method for forming a multilayer coating film means the solid concentration at the time of 1 minute after coating in the uncured coating film formed by applying the first aqueous base coating composition (B) alone not to the uncured aqueous intermediate coating film but to a substrate having no water absorption property, such as a resin substrate. The "solid content concentration $NV_{sB}$ (% by mass) attained at 1 minute after coating" can be referred to as the solid concentration derived from the constitution of the coating composition.

The solid concentration $NV_{sB}$ (% by mass) is preferably 20% by mass or more and 40% by mass or less. The solid concentration $NV_{sB}$ being in the above range affords an advantage that the appearance of the coating film to be formed by application becomes good.

In the above-described method for forming a multilayer coating film, that the solid concentration $NV_{mB}$ (% by mass) attained at 1 minute after coating, of the uncured first aqueous base coating film formed in the first aqueous base coating step and the solid concentration $NV_{sB}$ (% by mass) attained at 1 minute after coating, of the uncured first aqueous base coating film formed by applying the first aqueous base coating composition (B) alone satisfy the following formula, $$1.2 \leq NV_{mB}/NV_{sB}$$

means that the solid concentration $NV_{mB}$ attained at 1 minute after coating, of the uncured first aqueous base coating film formed on the uncured aqueous intermediate coating film in the first aqueous base coating step is 1.2 times or more higher as compared to the solid concentration $NV_{sB}$ at 1 minute after coating of the uncured first aqueous base coating film formed by applying the first aqueous base coating composition (B) alone. For all of these solid concentrations, the time until the solid concentration is measured after application is the same. The difference is the object to which the first aqueous base coating composition (B) is applied. The reason why the solid concentration $NV_{mB}$ attained at 1 minute after coating, of the uncured first aqueous base coating film formed on the uncured aqueous intermediate coating film in the first aqueous base coating step is higher as compared to the solid concentration $NV_{sB}$ is considered that in the uncured first aqueous base coating film formed on the uncured aqueous intermediate coating film, solvent components such as the aqueous solvent contained in the coating composition migrate to the uncured aqueous intermediate coating film.

In the present description, the solid concentration of a coating film is measured in accordance with JIS K5601. Specifically, 1 g of an uncured coating film is weighed out, the percentage (heating residue) of the mass of the residue after heating under the specified conditions in accordance with JIS K5601 (at 125° C. for 60 minutes) to the original mass is determined, and the value obtained is taken as the solid concentration of the coating film.

The solid concentration $NV_{mA}$ (% by mass) of the uncured aqueous intermediate coating film in the first aqueous base coating step is preferably 80% by mass or more. Examples of the method for adjusting the solid concentration $NV_{mA}$ (% by mass) of the aqueous intermediate coating film to 80% by mass or more include preheating after applying the aqueous intermediate coating composition (A).

The viscosity $\eta_{sB}$ attained at 1 minute after coating, of the uncured first aqueous base coating film formed by applying the first aqueous base coating composition (B) alone is preferably in the range of 30 to 300 Pa·s. The viscosity $\eta_{mB}$ attained at 1 minute after coating, of the uncured first aqueous base coating film formed on the uncured aqueous intermediate coating film in the first aqueous base coating step is preferably 270 Pa·s or more. The viscosity $\eta_{mB}$ being in the above range affords an advantage that the coating film shape of the first aqueous base coating film can be favorably maintained in the subsequent second aqueous base coating step. The viscosity $\eta_{sB}$ being in the above range affords an advantage that the coating workability of the first aqueous base coating composition (B) can be secured in a good condition.

The viscosity of the uncured first aqueous base coating film can be measured using a viscoelasticity analyzer. More specifically, it can be measured as the viscosity at the time when being measured at a shear rate of 0.1 sec$^{-1}$ in the course of changing the shear rate from 1000 sec$^{-1}$ to 0.01 sec$^{-1}$ at a temperature of 20° C. using a viscoelasticity analyzer Discovery-HR3 rheometer (manufactured by TA Instruments Japan Inc.).

Second Aqueous Base Coating Step

The second aqueous base coating step is a step of applying a second aqueous base coating composition (C) containing a scaly luster pigment to the uncured first aqueous base coating film to form an uncured second aqueous base coating film. The second aqueous base coating composition (C) can be applied in the same manner as the application of the first aqueous base coating composition. The thickness of the second aqueous base coating film to be formed is preferably, for example, 1 to 40 μm in terms of a dry film thickness, and more preferably 2 to 30 μm.

In the method for forming a multilayer coating film, it is required that the solid concentration $NV_{mB}$ (% by mass) attained at 1 minute after coating, of the uncured first aqueous base coating film formed in the first aqueous base coating step and the solid concentration $NV_{sC}$ (% by mass) attained at 1 minute after coating, of the uncured second aqueous base coating film formed by applying the second aqueous base coating composition (C) alone satisfy the following formula, $$NV_{mB}(\% \text{ by mass}) - NV_{sC}(\% \text{ by mass}) \geq 20(\% \text{ by mass}).$$

The "solid concentration $NV_{sC}$ (% by mass) attained at 1 minute after coating, of the uncured second aqueous base coating film formed by applying the second aqueous base coating composition (C) alone" in the method for forming a multilayer coating film is the same as the solid concentration $NV_{sB}$ regarding the first aqueous base coating composition. Therefore, it can be said that the solid concentration $NV_{sC}$ is the solid concentration derived from the constitution of the coating composition. In the above-described method for forming a multilayer coating film, that a solid concentration $NV_{mB}$ (% by mass) attained at 1 minute after coating, of the uncured first aqueous base coating film formed in the first aqueous base coating step and a solid concentration $NV_{sC}$ (% by mass) attained at 1 minute after coating, of an uncured second aqueous base coating film formed by applying the second aqueous base coating composition (C) alone satisfy the following formula:

$$NV_{mB} \text{ (\% by mass)} - NV_{sC} \text{ (\% by mass)} \geq 20 \text{(\% by mass)}$$

means that in the second aqueous base coating step in the method for forming a multilayer coating film, the solid concentration of the uncured first aqueous base coating film is sufficiently high as compared to the solid concentration of the second aqueous base coating composition to be applied. It is considered that since the solid concentration of the uncured first aqueous base coating film is sufficiently high as compared to the solid concentration of the second aqueous base coating composition to be applied, solvent components such as the aqueous solvent contained in the second aqueous base coating composition migrates favorably to the uncured first aqueous base coating film when the second aqueous base coating composition is applied. By this migration, the orientation of the scaly luster pigment contained in the second aqueous base coating composition (C) is brought into a good state, and there arises an advantage that unevenness of the orientation of the luster pigment can be reduced.

In the method for forming a multilayer coating film, the solid concentration $NV_{sC}$ (% by mass) attained at 1 minute after coating, of an uncured second aqueous base coating film formed by applying the second aqueous base coating composition (C) alone is preferably 10% by mass or more and 25% by mass or less. The "solid concentration $NV_{sC}$ (% by mass) attained at 1 minute after coating, of the uncured second aqueous base coating film formed by applying the second aqueous base coating composition (C) alone" means the solid concentration at the time of 1 minute after coating in the uncured coating film formed by applying the second aqueous base coating composition (C) alone not to the uncured first aqueous base coating film but to a substrate having no water absorption property, such as a resin substrate. The "solid content concentration $NV_{sC}$ (% by mass) attained at 1 minute after coating" can be referred to as the solid concentration derived from the constitution of the coating composition.

When the solid concentration $NV_{sC}$ (% by mass) is 10% by mass or more and 25% by mass or less, this means that the solid concentration is basically low as comparted to the preferable range (20% by mass or more and 40% by mass or less) of the solid concentration $NV_{sB}$. Furthermore, in the above-described method for forming a multilayer coating, because of the requirement that the formula:

$$1.2 \leq NV_{mB}/NV_{sB}$$

is satisfied, the solid concentration $NV_{mB}$ of the uncured first aqueous base coating film formed in the first aqueous base coating step is higher than the solid concentration $NV_{sB}$ of the uncured first aqueous base coating film formed by applying the first aqueous base coating composition alone. Therefore, a significantly large difference in solid concentration is made between the solid concentration $NV_{mB}$ of the uncured first aqueous base coating film formed in the first aqueous base coating step and the solid concentration $NV_{sC}$ of the uncured second aqueous base coating film formed by applying the second aqueous base coating composition (C) alone. As a result of this, solvent components such as an aqueous solvent contained in the second aqueous base coating composition migrate well into the uncured first aqueous base coating film and the scaly luster pigment contained in the second aqueous base coating composition (C) has a good orientation, affording an advantage that the unevenness of the orientation of the luster pigment can be effectively reduced and the resulting multilayer coating film has a good appearance.

Clear Coating Step

The clear coating step is a step of applying the clear coating composition (D) onto the uncured second aqueous base coating film obtained as described above to form an uncured clear coating film. The clear coating composition (D) can be applied by a commonly used method depending on the form of the coating composition. Example of the method for applying the clear coating composition to the base coating film include an application method using a rotary atomizing electrostatic coating machine called Microbell.

Generally, the dry thickness of a clear coating film to be formed by applying the above-described clear coating composition (D) is preferably about 10 to 80 μm, and more preferably about 20 to 60 μm. The condition that the dry film thickness is within the above range offers the advantage that the property of concealing irregularities of a base is good and the coating workability can be secured well.

Curing Step

The curing step is a step of heat curing at once the uncured aqueous intermediate coating film, the uncured first aqueous base coating film, the uncured second aqueous base coating film, and the uncured clear coating film each obtained in the preceding steps to form a multilayer coating film. The heat curing condition is preferably set to 80 to 180° C., and more preferably set to 120 to 160° C. The heating time may be arbitrarily set according to the heating temperature and, for example, when the heating temperature is 120° C. to 160° C., the heating time is preferably 10 to 40 minutes.

The thickness of the multilayer coating film formed as described above is, for example, in the range of 20 to 300 μm, and preferably in the range of 30 to 250 μm.

The multilayer coating film to be formed by the above method has a high orientation of the scaly luster pigment contained in the second aqueous base coating film, has a reduced orientation unevenness of the luster pigment, and has good coating film appearance. More specifically, in the method for forming a multilayer coating film, by controlling the solid concentration of the first aqueous base coating film formed in a coating step, and the solid concentrations of the coating films formed of the first aqueous base coating composition and the second aqueous base coating composition in the specific ranges, the orientation of the scaly luster pigment contained in the second aqueous base coating film is improved and the coating film appearance is improved.

EXAMPLES

The present invention will be described hereafter in more detail by way of examples, to which the present invention is not intended to be limited. In the examples, "parts" and "%" are on a mass basis unless otherwise indicated.

Production Example 1 Production of Acrylic Resin Emulsion A reaction vessel was charged with 330 g of deionized water, and the temperature was raised to 80° C. with mixing and stirring in a nitrogen stream. Then, a 3% portion of a monomer emulsion composed of 11.25 parts of acrylic acid, 139 parts of n-butyl acrylate, 75 parts of methyl methacrylate, 187 parts of n-butyl methacrylate, 75 parts of 2-ethylhexyl methacrylate, 150 parts of 2-hydroxyethyl methacrylate, 112 parts of styrene, 11.2 parts of Thiocalcol 20 (n-dodecylmercaptan, manufactured by Kao Corporation, active component content: 100%), 74.3 parts of Latemur PD-104 (emulsifier, manufactured by Kao Corporation, active component content: 20%), and 300 parts of deionized water, and a 30% portion of an initiator solution composed of 2.63 parts of ammonium persulfate and 90 parts of deionized water were added dropwise to the reaction vessel in parallel over 15 minutes. After the completion of the addition, aging was carried out at that temperature for 15 minutes.

Furthermore, the remainders of the monomer emulsion and the initiator solution were added dropwise to the reaction vessel in parallel over 180 minutes. After the completion of the dropping, aging was carried out at the same temperature for 1 hour.

Then, the mixture was cooled to 40° C. and was filtered through a 200 mesh filter, affording an acrylic resin emulsion having an average particle diameter of 200 nm, a resin solid content of 49% by mass, a solid acid value of 15 mg KOH/g, and a hydroxyl value of 85 mg KOH/g.

Production Example 2 Production of Aqueous Polyester Dispersion

A reaction vessel equipped with a stirrer, a nitrogen inlet tube, a temperature controller, a condenser, and a decanter was charged with 250 parts of trimethylolpropane, 824 parts of adipic acid, and 635 parts of cyclohexanedicarboxylic acid, then the mixture was heated to 180° C., and then a condensation reaction was carried out until no more water distilled out. After cooling to 60° C., 120 parts of phthalic anhydride was added and the mixture was heated to 140° C. and held for 60 minutes, affording a polyester resin having a number-average molecular weight of 2,000 as determined by GPC measurement. Fifty nine parts of dimethylaminoethanol (corresponding to 80% of the acid value of the resin (neutralization ratio: 80%)) was added at 80° C., and 1920 parts of deionized water was further added, followed by stirring, and thus an aqueous polyester dispersion having a resin solid content of 45% by mass was obtained. The hydroxyl value of the aqueous polyester dispersion in terms of resin solid content was 90 mg KOH/g and the acid value was 35 mg KOH/g.

Production Example 3 Production of Coloring Pigment Paste

After preliminarily mixing 9.2 parts of a commercially available dispersing agent "Disperbyk 190" (produced by BYK-Chemie), 17.8 parts of ion-exchanged water, and 73.0 parts of rutile type titanium dioxide, a bead medium was added to the mixture in a paint conditioner, and mixed and dispersed at room temperature until the particle size reached 5 μm or less, and then the bead medium was removed by filtration and thus a coloring pigment paste was obtained.

Production Example 4 Production of Aqueous Intermediate Coating Composition (A)

The acrylic resin emulsion obtained in Production Example 1 (resin solid content: 49% by mass)(100 parts) and 80 parts of the aqueous polyester dispersion obtained in Production Example 2 (resin solid content: 45% by mass) were stirred. To this mixture was added 137.7 parts of the coloring pigment paste of Production Example 3, the pH was adjusted to 8.0 with 0.01 parts of dimethylethanolamine (produced by Kishida Chemical Co., Ltd.), and 1.0 part of ADEKA NOL UH-814N (urethane association type thickening agent, active component content: 30%, produced by ADEKA Corporation, trade name) was mixed and stirred, and the mixture was stirred until it became uniform. To this mixture was added 40.9 parts of Bayhydur 305 (polyisocyanate compound having an ethylene oxide group manufactured by Sumika Bayer Urethane Co., Ltd., ethylene oxide content: 20% by mass, isocyanate group content: 16% by mass), and thus an aqueous intermediate coating composition was obtained.

Example 1

Production of First Aqueous Base Coating Composition (B-1)

The acrylic resin emulsion of Production Example 1 (130 parts), 1.8 parts of dimethylaminoethanol, 40 parts of CYMEL 327 (mixed alkylated type melamine resin, manufactured by Mitsui Cytec, Ltd., solid content: 90% by mass), and 1.0 part of ADEKA NOL UH-814N (urethane association type thickening agent, active component content: 30%, manufactured by ADEKA Corporation, trade name) were uniformly dispersed, followed by dilution with deionized water, affording a first aqueous base coating composition (B-1) having a value of 615 mPa·s measured with a B type viscometer at 60 rpm at a coating material temperature of 23° C. and a coating material solid concentration of 22% by mass.

Production of Second Aqueous Base Coating Composition (C-1)

The acrylic resin emulsion of Production Example 1 (130 parts), 1.8 parts of dimethylaminoethanol, 40 parts of CYMEL 327 (mixed alkylated type melamine resin, manufactured by Mitsui Cytec, Ltd., solid content: 90% by mass), 127.5 parts of an aluminum paste (scaly luster pigment solid content: 25% by mass), and 7.0 parts of ADEKA NOL UH-814N (urethane association type thickening agent, active component content: 30%, manufactured by ADEKA Corporation, trade name) were uniformly dispersed, followed by dilution with deionized water, affording a second aqueous base coating composition (C-1) having a value of 806 mPa·s measured with a B type viscometer at 60 rpm at a coating material temperature of 23° C. and a coating material solid concentration of 16% by mass.

Multilayer Coating Film Formation

POWERNIX 150 (trade name, cationic electrodeposition coating material manufactured by Nippon Paint Automotive Coatings Co., Ltd.) was electrodeposition applied to a dull steel sheet treated with zinc phosphate such that the dry film thickness was 20 μm, followed by heat curing at 160° C. for 30 minutes and subsequent cooling, and thus a steel substrate was prepared as an article to be coated.

To the resulting substrate (the article to be coated), the aqueous intermediate coating composition (A) of Production Example 4 was applied with a rotary atomization type electrostatic coating device such that the dry film thickness was 20 μm, followed by preheating at 80° C. for 5 minutes (intermediate coating step).

To the resulting uncured aqueous intermediate coating film, the first aqueous base coating composition (B-1) was applied with a rotary atomization type electrostatic coating device such that the dry film thickness was 12 μm, followed by preheating at 80° C. for 3 minutes (first aqueous base coating step).

Then, to the resulting uncured first aqueous base coating film, the second aqueous base coating composition (C-1) was applied with a rotary atomization type electrostatic coating device such that the dry film thickness was 6 μm, followed by preheating at 80° C. for 3 minutes (second aqueous base coating step).

Then, MACFLOW-O-1810 (a solvent type clear coating composition manufactured by Nippon Paint Automotive Co., Ltd.) as a clear coating composition was air-spray applied such that the dry film thickness was 35 μm, and then set for 7 minutes. Then, the coated plate was heated in a heating oven at 140° C. for 30 minutes, affording a coated coating test plate with a multilayer coating film.

In forming the multilayer coating film, the solid concentration of each uncured coating film was measured by the following procedure. The measured results are shown in the following tables.

Measurement of Solid Concentration $NV_{mA}$ of Uncured Aqueous Intermediate Coating Film in the First Aqueous Base Coating Step An OHP sheet (PET sheet manufactured by KOKUYO Co., Ltd., "VF-1101N") was attached to the surface of the uncured aqueous intermediate coating film in the first aqueous base coating step from the opposite direction. Then, the OHP sheet was slowly peeled off. The uncured aqueous intermediate coating film detached together with the OHP sheet was scraped with a spatula.

A 1 gram portion of the scraped uncured coating film was weighed out, and then, the percentage (heating residue) of the mass of the residue after heating under the specified conditions in accordance with JIS K5601 to the original mass was determined, and the value obtained was taken as the solid concentration (% by mass) of the coating film. The heating conditions were executed by heating at 125° C. for 60 minutes.

Solid Concentration $NV_{mB}$ and Viscosity $\eta_{mB}$ Attained at 1 Minute after Coating, of Uncured First Aqueous Base Coating Film Formed in the First Aqueous Base Coating Step The OHP sheet mentioned above was attached to the surface of the uncured first aqueous base coating film formed in the first aqueous base coating step from the opposite direction, and then the sheet was peeled off. The procedure up to this point was performed within 1 minute after the first aqueous base coating composition was applied.

The solid concentration $NV_{mB}$ (% by mass) attained at the time of 1 minute after the coating with the first aqueous base coating composition, of the uncured first aqueous base coating film detached together with the OHP sheet was measured by the same procedure as above.

The viscosity $\eta_{mB}$ attained at 1 minute after coating, of the uncured first aqueous base coating film formed in the first aqueous base coating step was measured by using a viscoelasticity analyzer. Specifically, using a viscoelasticity analyzer Discovery-HR3 rheometer (manufactured by TA Instruments Japan Inc.), a viscosity at a shear rate of 0.1 sec$^{-1}$ in the course of changing the shear rate from 1000 sec$^{-1}$ to 0.01 sec$^{-1}$ was measured at a temperature of 20° C.

Solid Concentration $NV_{sB}$ and Viscosity $\eta_{sB}$ Attained at 1 Minute after Coating, of Uncured First Aqueous Base Coating Film Formed by Applying First Aqueous Base Coating Composition Alone Separately from the process of forming a multilayer coating film described above, the first aqueous base coating composition was applied to a tin plate, which was a substrate.

The solid concentration $NV_{sB}$ (% by mass) of the uncured first aqueous base coating film attained at 1 minute after the coating with the first aqueous base coating composition was measured by the same procedure as described above.

The viscosity $\eta_{sB}$ attained at 1 minute after coating, of the first aqueous base coating film was measured by the same procedure as described above.

Solid Concentration $NV_{sC}$ Attained at 1 Minute after Coating, of Uncured Second Aqueous Base Coating Film Formed by Applying Second Aqueous Base Coating Composition Alone Separately from the process of forming a multilayer coating film described above, the second aqueous base coating composition was applied to a tin plate, which was a substrate.

The solid concentration $NV_{sC}$ (% by mass) of the uncured second aqueous base coating film attained at 1 minute after the coating with the second aqueous base coating composition was measured by the same procedure as described above.

Examples 2, 3, 5, 6, 8 to 19, Comparative Examples 1 to 6

A first aqueous base coating composition was prepared by the same procedure as in Example 1 except that the amounts of the viscosity control agent and the water were adjusted such that the coating material viscosity and the solid concentration of the first aqueous base coating composition were the values shown in the following table. Then, a multilayer coating film was formed by the same procedure as in Example 1 except that in the intermediate coating step, preheating was carried out under the conditions shown in the following table after applying the aqueous intermediate coating composition.

Examples 4, 7, 20

A first aqueous base coating composition was prepared by the same procedure as in Example 1 except that the amounts of the viscosity control agent and the water were adjusted such that the coating material viscosity and the solid concentration of the first aqueous base coating composition were the values shown in the following table.

Furthermore, a second aqueous base coating composition was prepared by the same procedure as in Example 1 except that the amounts of the viscosity control agent and the water were adjusted such that the coating material viscosity and the solid concentration of the second aqueous base coating composition were the values shown in the following table.

Then, a multilayer coating film was formed by the same procedure as in Example 1 except that in the intermediate coating step, preheating was carried out under the conditions shown in the following table after applying the aqueous intermediate coating composition.

Example 21

A first aqueous base coating composition was prepared by the same procedure as in Example 1 except that in the production of the first aqueous base coating composition, the amount of the acrylic resin emulsion of Production Example 1 was changed to 200 parts and the amounts of the viscosity control agent and the water were adjusted such that the coating material viscosity and the solid concentration were the values shown in the following table.

Then, a multilayer coating film was formed by the same procedure as in Example 1 except that in the intermediate coating step, preheating was carried out under the conditions shown in the following table after applying the aqueous intermediate coating composition.

Example 22

A first aqueous base coating composition was prepared by the same procedure as in Example 1 except that in the production of the first aqueous base coating composition, the amount of the acrylic resin emulsion of Production Example 1 was changed to 80 parts and the amounts of the viscosity control agent and the water were adjusted such that the coating material viscosity and the solid concentration were the values shown in the following table.

Then, a multilayer coating film was formed by the same procedure as in Example 1 except that in the intermediate coating step, preheating was carried out under the conditions shown in the following table after applying the aqueous intermediate coating composition.

Example 23

A first aqueous base coating composition was prepared by the same procedure as in Example 1 except that in the production of the first aqueous base coating composition, the amount of CYMEL 327 was changed to 80 parts and the amounts of the viscosity control agent and the water were adjusted such that the coating material viscosity and the solid concentration were the values shown in the following table.

Then, a multilayer coating film was formed by the same procedure as in Example 1 except that in the intermediate coating step, preheating was carried out under the conditions shown in the following table after applying the aqueous intermediate coating composition.

Example 24

A first aqueous base coating composition was prepared by the same procedure as in Example 1 except that in the production of the first aqueous base coating composition, the amount of CYMEL 327 was changed to 25 parts and the amounts of the viscosity control agent and the water were adjusted such that the coating material viscosity and the solid concentration were the values shown in the following table.

Then, a multilayer coating film was formed by the same procedure as in Example 1 except that in the intermediate coating step, preheating was carried out under the conditions shown in the following table after applying the aqueous intermediate coating composition.

Example 25

A second aqueous base coating composition was prepared by the same procedure as in Example 1 except that in the production of the second aqueous base coating composition, the amount of the acrylic resin emulsion of Production Example 1 was changed to 200 parts and the amounts of the viscosity control agent and the water were adjusted such that the coating material viscosity and the solid concentration were the values shown in the following table.

Then, a multilayer coating film was formed by the same procedure as in Example 1 except that in the intermediate coating step, preheating was carried out under the conditions shown in the following table after applying the aqueous intermediate coating composition.

Example 26

A second aqueous base coating composition was prepared by the same procedure as in Example 1 except that in the production of the second aqueous base coating composition, the amount of the acrylic resin emulsion of Production Example 1 was changed to 80 parts and the amounts of the viscosity control agent and the water were adjusted such that the coating material viscosity and the solid concentration were the values shown in the following table.

Then, a multilayer coating film was formed by the same procedure as in Example 1 except that in the intermediate coating step, preheating was carried out under the conditions shown in the following table after applying the aqueous intermediate coating composition.

Example 27

A second aqueous base coating composition was prepared by the same procedure as in Example 1 except that in the production of the second aqueous base coating composition, the amount of CYMEL 327 was changed to 80 parts and the amounts of the viscosity control agent and the water were adjusted such that the coating material viscosity and the solid concentration were the values shown in the following table.

Then, a multilayer coating film was formed by the same procedure as in Example 1 except that in the intermediate coating step, preheating was carried out under the conditions shown in the following table after applying the aqueous intermediate coating composition.

Example 28

A second aqueous base coating composition was prepared by the same procedure as in Example 1 except that in the production of the second aqueous base coating composition, the amount of CYMEL 327 was changed to 25 parts and the amounts of the viscosity control agent and the water were adjusted such that the coating material viscosity and the solid concentration were the values shown in the following table.

Then, a multilayer coating film was formed by the same procedure as in Example 1 except that in the intermediate coating step, preheating was carried out under the conditions shown in the following table after applying the aqueous intermediate coating composition.

Example 29

A second aqueous base coating composition was prepared by the same procedure as in Example 1 except that in the production of the second aqueous base coating composition, the amount of the aluminum paste was changed to 80 parts and the amounts of the viscosity control agent and the water were adjusted such that the coating material viscosity and the solid concentration were the values shown in the following table.

Then, a multilayer coating film was formed by the same procedure as in Example 1 except that in the intermediate coating step, preheating was carried out under the conditions shown in the following table after applying the aqueous intermediate coating composition.

Example 30

A second aqueous base coating composition was prepared by the same procedure as in Example 1 except that in the production of the second aqueous base coating composition, the amount of the aluminum paste was changed to 160 parts and the amounts of the viscosity control agent and the water were adjusted such that the coating material viscosity and the solid concentration were the values shown in the following table.

Then, a multilayer coating film was formed by the same procedure as in Example 1 except that in the intermediate coating step, preheating was carried out under the conditions shown in the following table after applying the aqueous intermediate coating composition.

Example 31

A first aqueous base coating composition and a second aqueous base coating composition were prepared in the same manner as in Example 3.

A multilayer coating film was formed by the same procedure as in Example 3 except that in the first aqueous base coating step, the first aqueous base coating composition was applied such that the dry film thickness was 18 μm.

Example 32

A first aqueous base coating composition was prepared by the same procedure as in Example 3 except that in the production of the first aqueous base coating composition, 120 parts of an aluminum paste (scaly luster color pigment solid content: 25% by mass) was further added.

A multilayer coating film was formed by the same procedure as in Example 3 except that the first aqueous base coating composition obtained was used.

Comparative Example 7

A multilayer coating film was formed by the same procedure as in Example 1 except that the aqueous intermediate coating composition was applied in the intermediate coating step, followed curing the coating film by heating at 140° C. for 30 minutes, and then the first aqueous base coating composition was applied.

Comparative Example 8

A multilayer coating film was formed by the same procedure as in Example 8 except that the aqueous intermediate coating composition was applied in the intermediate coating step, followed curing the coating film by heating at 140° C. for 30 minutes, and then the first aqueous base coating composition was applied.

Using the multilayer coating films obtained in the above examples and comparative examples, the following evaluations were carried out. The results of the evaluations are shown in the following tables.

Coating Unevenness Evaluation

The coating film surface of the multilayer coating film obtained was visually evaluated based on the following criteria.

○: The entire coating film has a uniform color and no remarkable color unevenness occurs.

Δ: Color unevenness is seen in part of the coating film, but there is no problem in practical use x: Color unevenness remarkably occurs on the coating film Flip-Flop Property (FF Property) Evaluation A FF value measured using a laser type metallic-texture measuring apparatus (trade name: ALCOPE LMR-200, manufactured by Kansai Paint Co., Ltd.) was used as an index of flip-flop property. The larger the FF value, the stronger the flip-flop property. The evaluation of the flip-flop property is in accordance with the following criteria, and when the value is 1.41 or more, this is evaluated as passing.

○: The flip-flop value is 1.51 or more.

Δ: The flip-flop value is 1.41 or more and less than 1.51.

x: The flip-flop value is less than 1.41.

In the present invention, "the flip-flop property is strong" means that when a metallic coating film is visually observed, it looks white from the front direction (perpendicularly to the coating surface), and it glitters to be superior in sparkle texture, while observed from an oblique direction, the sparkle texture is weak and the hue is clearly visible, and the difference in brightness between the two observations is large. That is, a metallic coating film whose metallic texture remarkably changes depending on the viewing angle is expressed to be "strong in flip-flop property" and has a superior designability.

TABLE 1

|  | Example 1 | Example 2 | Example 3 | Example 4 | Example 5 | Example 6 | Example 7 | Example 8 | Example 9 | Example 10 |
|---|---|---|---|---|---|---|---|---|---|---|
| Solid concentration $NV_{mA}$ (%) of uncured aqueous intermediate coating film | 98% | 95% | 90% | 90% | 85% | 80% | 80% | 95% | 90% | 85% |
| Coating material solid concentration (%) of first aqueous base coating composition | 22% | 22% | 22% | 22% | 22% | 22% | 22% | 27% | 27% | 27% |
| Coating material viscosity (mPa · s) of first aqueous base coating composition | 615 | 615 | 615 | 455 | 455 | 365 | 365 | 575 | 575 | 475 |
| Solid concentration $NV_{sB}$ (%) of uncured first aqueous base coating film formed by applying first aqueous base coating composition alone | 27% | 27% | 27% | 27% | 27% | 27% | 27% | 32% | 32% | 32% |

TABLE 1-continued

|  | | | | | | | | | | |
|---|---|---|---|---|---|---|---|---|---|---|
| Solid concentration $NV_{mB}$ (%) of uncured first aqueous base coating film of first aqueous base coating step | 51% | 54% | 48% | 48% | 44% | 41% | 41% | 56% | 52% | 48% |
| $NV_{mB}/NV_{sB}$ | 1.9 | 2.0 | 1.8 | 1.8 | 1.6 | 1.5 | 1.5 | 1.8 | 1.6 | 1.5 |
| Coating material solid concentration (%) of second aqueous base coating composition | 16% | 16% | 16% | 12% | 16% | 16% | 12% | 16% | 16% | 16% |
| Coating material viscosity (mPa·s) of second aqueous base coating composition | 806 | 806 | 806 | 780 | 806 | 806 | 780 | 806 | 806 | 806 |
| Solid concentration $NV_{sC}$ (%) of uncured second aqueous base coating film formed by applying second aqueous base coating composition alone | 19% | 19% | 19% | 15% | 19% | 19% | 15% | 19% | 19% | 19% |
| $NV_{mB}-NV_{sC}$ | 32% | 35% | 29% | 33% | 25% | 22% | 26% | 37% | 33% | 29% |
| Viscosity $\eta_{sB}$ (Pa·s) of uncured first aqueous base coating film formed by applying first aqueous base coating composition alone | 100 | 100 | 100 | 70 | 70 | 50 | 50 | 95 | 95 | 77 |
| Viscosity $\eta_{mB}$ (Pa·s) of uncured first aqueous base coating film of first aqueous base coating step | 550 | 550 | 550 | 400 | 410 | 330 | 330 | 500 | 500 | 420 |
| Conditions for preheating or bake curing after application of intermediate coating composition | Preheating, 80° C., 5 min | Preheating, 80° C., 4 min | Preheating, 80° C., 3 min | Preheating, 80° C., 3 min | Preheating, 80° C., 2 min | Preheating, 70° C., 3 min | Preheating, 70° C., 3 min | Preheating, 80° C., 4 min | Preheating, 80° C., 3 min | Preheating, 80° C., 2 min |
| Coating unevenness evaluation | ○ | ○ | ○ | ○ | ○ | ○ | ○ | ○ | ○ | ○ |
| FF value | ○ | ○ | ○ | ○ | ○ | ○ | ○ | ○ | ○ | ○ |

|  | Example 11 | Example 12 | Example 13 | Example 14 | Example 15 | Example 16 | Example 17 | Example 18 | Example 19 | Example 20 | Example 21 |
|---|---|---|---|---|---|---|---|---|---|---|---|
| Solid concentration $NV_{mA}$ (%) of uncured aqueous intermediate coating film | 83% | 80% | 90% | 90% | 85% | 90% | 90% | 90% | 90% | 90% | 90% |
| Coating material solid concentration (%) of first aqueous base coating composition | 27% | 27% | 27% | 32% | 32% | 22% | 22% | 36% | 15% | 22% | 25% |
| Coating material viscosity (mPa·s) of first aqueous base coating composition | 380 | 300 | 650 | 770 | 710 | 1500 | 2000 | 810 | 650 | 615 | 850 |
| Solid concentration $NV_{sB}$ (%) of uncured first aqueous base coating film formed by applying first aqueous base coating composition alone | 32% | 32% | 32% | 36% | 36% | 27% | 27% | 40% | 20% | 27% | 30% |
| Solid concentration $NV_{mB}$ (%) of uncured first aqueous base coating film of first aqueous base coating step | 45% | 41% | 54% | 48% | 44% | 48% | 48% | 57% | 40% | 48% | 51% |
| $NV_{mB}/NV_{sB}$ | 1.4 | 1.29 | 1.7 | 1.3 | 1.20 | 1.8 | 1.8 | 1.4 | 2.0 | 1.8 | 1.7 |
| Coating material solid concentration (%) of second aqueous base coating composition | 16% | 16% | 16% | 16% | 16% | 16% | 16% | 16% | 16% | 23% | 16% |
| Coating material viscosity (mPa·s) of second aqueous base coating composition | 806 | 806 | 806 | 806 | 806 | 806 | 806 | 806 | 806 | 870 | 806 |
| Solid concentration $NV_{sC}$ (%) of uncured second aqueous base coating film formed by applying second aqueous base coating composition alone | 19% | 19% | 19% | 19% | 19% | 19% | 19% | 19% | 19% | 28% | 19% |
| $NV_{mB}-NV_{sC}$ | 26% | 22% | 35% | 29% | 25% | 29% | 29% | 38% | 21% | 20% | 32% |
| Viscosity $\eta_{sB}$ (Pa·s) of uncured first aqueous base coating film formed by applying first aqueous base coating composition alone | 57 | 30 | 105 | 125 | 115 | 220 | 300 | 135 | 100 | 100 | 210 |
| Viscosity $\eta_{mB}$ (Pa·s) of uncured first aqueous base coating film of first aqueous base coating step | 340 | 270 | 580 | 690 | 630 | 1100 | 1540 | 710 | 560 | 550 | 1110 |
| Conditions for preheating or bake curing after application of intermediate coating composition | Preheating, 70° C., 4 min | Preheating, 70° C., 3 min | Preheating, 80° C., 3 min | Preheating, 80° C., 3 min | Preheating, 80° C., 2 min | Preheating, 80° C., 3 min | Preheating, 80° C., 3 min | Preheating, 80° C., 3 min | Preheating, 80° C., 3 min | Preheating, 80° C., 3 min | Preheating, 80° C., 3 min |
| Coating unevenness evaluation | ○ | ○ | ○ | ○ | ○ | ○ | ○ | ○ | ○ | ○ | ○ |
| FF value | ○ | ○ | ○ | ○ | ○ | ○ | ○ | ○ | ○ | ○ | ○ |

TABLE 2

|  | Example 22 | Example 23 | Example 24 | Example 25 | Example 26 | Example 27 | Example 28 | Example 29 | Example 30 | Example 31 |
|---|---|---|---|---|---|---|---|---|---|---|
| Solid concentration $NV_{mA}$ (%) of uncured aqueous intermediate coating film | 90% | 90% | 90% | 90% | 90% | 90% | 90% | 90% | 90% | 90% |
| Coating material solid concentration (%) of first aqueous base coating composition | 19% | 28% | 19% | 22% | 22% | 22% | 22% | 22% | 22% | 22% |
| Coating material viscosity (mPa·s) of first aqueous base coating composition | 465 | 950 | 405 | 615 | 615 | 615 | 615 | 615 | 615 | 615 |
| Solid concentration $NV_{sB}$ (%) of uncured first aqueous base coating film formed by applying first aqueous base coating composition alone | 24% | 33% | 24% | 27% | 27% | 27% | 27% | 27% | 27% | 26% |
| Solid concentration $NV_{mB}$ (%) of uncured first aqueous base coating film of first aqueous base coating step | 45% | 53% | 44% | 48% | 48% | 48% | 48% | 48% | 48% | 45% |
| $NV_{mB}/NV_{sB}$ | 1.9 | 1.6 | 1.8 | 1.8 | 1.8 | 1.8 | 1.8 | 1.8 | 1.8 | 1.7 |
| Coating material solid concentration (%) of second aqueous base coating composition | 16% | 16% | 16% | 19% | 14% | 21% | 13% | 15% | 17% | 16% |
| Coating material viscosity (mPa·s) of second aqueous base coating composition | 806 | 806 | 806 | 1,820 | 520 | 1,250 | 760 | 680 | 910 | 806 |
| Solid concentration $NV_{sC}$ (%) of uncured second aqueous base coating film formed by applying second aqueous base coating composition alone | 19% | 19% | 19% | 23% | 17% | 25% | 16% | 18% | 18% | 19% |
| $NV_{mB}-NV_{sC}$ | 26% | 34% | 25% | 25% | 31% | 23% | 32% | 30% | 30% | 26% |
| Viscosity $\eta_{sB}$ (Pa·s) of uncured first aqueous base coating film formed by applying first aqueous base coating composition alone | 85 | 230 | 80 | 100 | 100 | 100 | 100 | 100 | 100 | 100 |
| Viscosity $\eta_{mB}$ (Pa·s) of uncured first aqueous base coating film of first aqueous base coating step | 485 | 1250 | 430 | 550 | 550 | 550 | 550 | 550 | 550 | 480 |
| Conditions for preheating or bake curing after application of intermediate coating composition | Preheating, 80° C., 3 min | Preheating, 80° C., 3 min | Preheating, 80° C., 3 min | Preheating, 80° C., 3 min | Preheating, 80° C., 3 min | Preheating, 80° C., 3 min | Preheating, 80° C., 3 min | Preheating, 80° C., 3 min | Preheating, 80° C., 3 min | Preheating, 80° C., 3 min |
| Coating unevenness evaluation | ○ | ○ | ○ | ○ | ○ | ○ | ○ | ○ | ○ | ○ |
| FF value | ○ | ○ | ○ | ○ | ○ | ○ | ○ | ○ | ○ | ○ |

|  | Example 32 | Comparative Example 1 | Comparative Example 2 | Comparative Example 3 | Comparative Example 4 | Comparative Example 5 | Comparative Example 6 | Comparative Example 7 | Comparative Example 8 |
|---|---|---|---|---|---|---|---|---|---|
| Solid concentration $NV_{mA}$ (%) of uncured aqueous intermediate coating film | 90% | 75% | 75% | 70% | 85% | 80% | 75% |  |  |
| Coating material solid concentration (%) of first aqueous base coating composition | 25% | 22% | 27% | 27% | 32% | 32% | 32% | 22% | 27% |
| Coating material viscosity (mPa·s) of first aqueous base coating composition | 890 | 300 | 345 | 305 | 710 | 710 | 710 | 615 | 575 |
| Solid concentration $NV_{sB}$ (%) of uncured first aqueous base coating film formed by applying first aqueous base coating composition alone | 30% | 27% | 32% | 32% | 36% | 36% | 36% | 27% | 32% |
| Solid concentration $NV_{mB}$ (%) of uncured first aqueous base coating film of first aqueous base coating step | 51% | 35% | 37% | 35% | 44% | 41% | 38% | 27% | 32% |
| $NV_{mB}/NV_{sB}$ | 1.7 | 1.3 | 1.16 | 1.10 | 1.21 | 1.12 | 1.04 | 1.00 | 1.01 |
| Coating material solid concentration (%) of second aqueous base coating composition | 16% | 16% | 16% | 16% | 20% | 16% | 16% | 16% | 16% |
| Coating material viscosity (mPa·s) of second aqueous base coating composition | 806 | 806 | 806 | 806 | 790 | 806 | 806 | 806 | 806 |

TABLE 2-continued

| Solid concentration $NV_{sC}$ (%) of uncured second aqueous base coating film formed by applying second aqueous base coating composition alone | 19% | 19% | 19% | 19% | 25% | 19% | 19% | 19% | 19% |
|---|---|---|---|---|---|---|---|---|---|
| $NV_{mB}-NV_{sC}$ | 32% | 16% | 18% | 16% | 19% | 22% | 19% | 8% | 13% |
| Viscosity $\eta_{sB}$ (Pa·s) of uncured first aqueous base coating film formed by applying first aqueous base coating composition alone | 100 | 43 | 50 | 45 | 115 | 115 | 115 | 100 | 95 |
| Viscosity $\eta_{mB}$ (Pa·s) of uncured first aqueous base coating film of first aqueous base coating step | 550 | 240 | 250 | 210 | 630 | 540 | 450 | 110 | 105 |
| Conditions for preheating or bake curing after application of intermediate coating composition | Pre-heating, 80° C., 3 min | Pre-heating, 60° C., 4 min | Pre-heating, 60° C., 4 min | Pre-heating, 60° C., 3 min | Pre-heating, 80° C., 2 min | Pre-heating, 70° C., 3 min | Pre-heating, 60° C., 4 min | Heat curing after intermediate | Heat curing after intermediate |
| Coating unevenness evaluation | ○ | Δ | Δ | Δx | Δ | Δ | Δx | Δx | Δ |
| FF value | ○ | ○ | ○ | ○ | ○ | ○ | ○ | ○ | ○ |

No coating unevenness (color unevenness) was observed in any of the multilayer coating films formed by the methods of the examples, and the FF property was also good.

Comparative Examples 1, 2 and 4 are examples in which the value of "$NV_{mB}$ (% by mass)–$NV_{sC}$ (% by mass)" is less than 20%. In these examples, coating unevenness (color unevenness) was confirmed.

Comparative Examples 3 and 6 are examples in which the value of "$NV_{mB}$ (% by mass)–$NV_{sC}$ (% by mass)" is less than 20% and the value of $NV_{mB}/NV_{sB}$ is less than 1.2. Also in these examples, coating unevenness (color unevenness) was confirmed.

Comparative Example 5 is an example in which the value of $NV_{mB}/NV_{sB}$ is less than 1.2. Also in these examples, coating unevenness (color unevenness) was confirmed.

Comparative Examples 7 and 8 are examples in which an aqueous intermediate coating composition was applied, followed by heat curing to form a cured intermediate coating film, and then a first aqueous base coating composition was applied. Also in these examples, coating unevenness (color unevenness) was confirmed.

INDUSTRIAL APPLICABILITY

According to the above method for forming a multilayer coating film, the orientation of a scaly luster pigment can be enhanced in a second aqueous base coating film containing the scaly luster pigment. The multilayer coating film formed by the above method for forming a multilayer coating film is characterized in that the unevenness in the orientation of a luster pigment is reduced and the coating film has good appearance.

The invention claimed is:

1. A method for forming a multilayer coating film, comprising:
   an intermediate coating step of applying an aqueous intermediate coating composition (A) to a surface of an article to be coated to form an uncured aqueous intermediate coating film;
   a first aqueous base coating step of applying a first aqueous base coating composition (B) onto the uncured aqueous intermediate coating film to form an uncured first aqueous base coating film;
   a second aqueous base coating step of applying a second aqueous base coating composition (C) containing a scaly luster pigment onto the uncured first aqueous base coating film to form an uncured second aqueous base coating film;
   a clear coating step of applying a clear coating composition (D) onto the uncured second aqueous base coating film to form an uncured clear coating film; and
   a curing step of heat curing at once the uncured aqueous intermediate coating film, the uncured first aqueous base coating film, the uncured second aqueous base coating film, and the uncured clear coating film each obtained in the preceding steps to form a multilayer coating film,
   wherein a solid concentration $NV_{mB}$ (% by mass) attained at 1 minute after coating, of the uncured first aqueous base coating film formed in the first aqueous base coating step and a solid concentration $NV_{sB}$ (% by mass) attained at 1 minute after coating, of an uncured first aqueous base coating film formed by applying the first aqueous base coating composition (B) directly to a substrate having no water absorption property satisfy formula:

$1.2 \leq NV_{mB}/NV_{sB}$, and the solid concentration $NV_{mB}$ (% by mass) and a solid concentration $NV_{sC}$ (% by mass) attained at 1 minute after coating, of an uncured second aqueous base coating film formed by applying the second aqueous base coating composition (C) directly to the substrate having no water absorption property satisfy formula:

$NV_{mB}$ (% by mass)–$NV_{sC}$ (% by mass)$\geq 20$ (% by mass).

2. The method for forming a multilayer coating film according to claim 1, wherein the uncured first aqueous base coating film formed in the first aqueous base coating step has a viscosity $\eta_{mB}$ attained at 1 minute after coating of 270 Pa·s or more.

3. The method for forming a multilayer coating film according to claim 2, wherein
   the solid concentration $NV_{sB}$ (% by mass) attained at 1 minute after coating, of the uncured first aqueous base coating film formed by applying the first aqueous base coating composition (B) directly to the substrate having no water absorption property is 20% by mass or more and 40% by mass or less, and
   a viscosity $\eta_{sB}$ attained at 1 minute after coating, of the uncured first aqueous base coating film formed by applying the first aqueous base coating composition (B)

directly to the substrate having no water absorption property is in a range of 30 to 300 Pa·s.

4. The method for forming a multilayer coating film according to claim 2, wherein the solid concentration $NV_{sC}$ (% by mass) attained at 1 minute after coating, of an uncured second aqueous base coating film formed by applying the second aqueous base coating composition (C) directly to the substrate having no water absorption property is 10% by mass or more and 25% by mass or less.

5. The method for forming a multilayer coating film according to claim 2, wherein a solid concentration $NV_{mA}$ (% by mass) of the uncured aqueous intermediate coating film in the first aqueous base coating step is 80% by mass or more.

6. The method for forming a multilayer coating film according to claim 2, wherein an amount of the scaly luster pigment contained in the second aqueous base coating composition (C) is in a range of 20 to 40 parts by mass per 100 parts by mass of the resin solid content of the second aqueous base coating composition (C).

7. The method for forming a multilayer coating film according to claim 1, wherein
the solid concentration $NV_{sB}$ (% by mass) attained at 1 minute after coating, of the uncured first aqueous base coating film formed by applying the first aqueous base coating composition (B) directly to the substrate having no water absorption property is 20% by mass or more and 40% by mass or less, and
a viscosity $\eta_{sB}$ attained at 1 minute after coating, of the uncured first aqueous base coating film formed by applying the first aqueous base coating composition (B) directly to the substrate having no water absorption property is in a range of 30 to 300 Pa·s.

8. The method for forming a multilayer coating film according to claim 7, wherein the solid concentration $NV_{sC}$ (% by mass) attained at 1 minute after coating, of an uncured second aqueous base coating film formed by applying the second aqueous base coating composition (C) directly to the substrate having no water absorption property is 10% by mass or more and 25% by mass or less.

9. The method for forming a multilayer coating film according to claim 7, wherein a solid concentration $NV_{mA}$ (% by mass) of the uncured aqueous intermediate coating film in the first aqueous base coating step is 80% by mass or more.

10. The method for forming a multilayer coating film according to claim 7, wherein an amount of the scaly luster pigment contained in the second aqueous base coating composition (C) is in a range of 20 to 40 parts by mass per 100 parts by mass of the resin solid content of the second aqueous base coating composition (C).

11. The method for forming a multilayer coating film according to claim 1, wherein the solid concentration $NV_{sC}$ (% by mass) attained at 1 minute after coating, of an uncured second aqueous base coating film formed by applying the second aqueous base coating composition (C) directly to the substrate having no water absorption property is 10% by mass or more and 25% by mass or less.

12. The method for forming a multilayer coating film according to claim 11, wherein a solid concentration $NV_{mA}$ (% by mass) of the uncured aqueous intermediate coating film in the first aqueous base coating step is 80% by mass or more.

13. The method for forming a multilayer coating film according to claim 11, wherein an amount of the scaly luster pigment contained in the second aqueous base coating composition (C) is in a range of 20 to 40 parts by mass per 100 parts by mass of the resin solid content of the second aqueous base coating composition (C).

14. The method for forming a multilayer coating film according to claim 1, wherein a solid concentration $NV_{mA}$ (% by mass) of the uncured aqueous intermediate coating film in the first aqueous base coating step is 80% by mass or more.

15. The method for forming a multilayer coating film according to claim 14, wherein an amount of the scaly luster pigment contained in the second aqueous base coating composition (C) is in a range of 20 to 40 parts by mass per 100 parts by mass of the resin solid content of the second aqueous base coating composition (C).

16. The method for forming a multilayer coating film according to claim 1, wherein an amount of the scaly luster pigment contained in the second aqueous base coating composition (C) is in a range of 20 to 40 parts by mass per 100 parts by mass of the resin solid content of the second aqueous base coating composition (C).

* * * * *